(12) United States Patent
Mehta et al.

(10) Patent No.: US 10,342,024 B1
(45) Date of Patent: Jul. 2, 2019

(54) METHODS AND SYSTEMS FOR ASSIGNING RESOURCES TO USER EQUIPMENT DEVICES

(71) Applicant: Sprint Spectrum L.P., Overland Park, KS (US)

(72) Inventors: Dhaval Mehta, Aldie, VA (US); Yun Sung Kim, Ashburn, VA (US); Yu Wang, Fairfax, VA (US); Udit Thakore, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 256 days.

(21) Appl. No.: 14/939,021

(22) Filed: Nov. 12, 2015

(51) Int. Cl.
*H04W 72/10* (2009.01)
*H04L 12/26* (2006.01)
*H04W 72/12* (2009.01)
*H04W 24/08* (2009.01)
*H04W 88/10* (2009.01)

(52) U.S. Cl.
CPC ......... *H04W 72/10* (2013.01); *H04L 43/0829* (2013.01); *H04L 43/16* (2013.01); *H04W 24/08* (2013.01); *H04W 72/12* (2013.01); *H04W 88/10* (2013.01)

(58) Field of Classification Search
CPC .................................................. H04W 48/06
See application file for complete search history.

(56) References Cited

U.S. PATENT DOCUMENTS

| 8,423,033 B1 | 4/2013 | Everson et al. | |
|---|---|---|---|
| 2011/0119761 A1* | 5/2011 | Wang | H04L 63/1458 726/23 |
| 2013/0294230 A1* | 11/2013 | Popa | H04W 36/22 370/230 |
| 2017/0142638 A1* | 5/2017 | Wang | H04W 48/06 |

* cited by examiner

*Primary Examiner* — Sulaiman Nooristany

(57) ABSTRACT

Method and systems for assigning resources to user equipment devices (UEs) from a base station are disclosed. In accordance with the disclosure, the base station operates in a first mode in which the base station gives a UE a first scheduling priority level for resource assignment from the base station. The base station then makes a determination that a packet drop rate for the UE exceeds a threshold packet drop rate. Based on the determination, the base station switches from operating in the first mode to operating in a second mode in which the base station gives the UE a second scheduling priority level for resource assignment from the base station, where the second scheduling priority level is higher than the first scheduling priority level.

14 Claims, 4 Drawing Sheets

METHODS AND SYSTEMS FOR ASSIGNING RESOURCES TO USER EQUIPMENT DEVICES

BACKGROUND

Unless otherwise indicated herein, the information described in this section is not itself prior art to the claims and is not admitted to be prior art by inclusion in this section.

In a wireless communication system, a base station provides one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not actually "user" operated). Further, the base station may be in communication with network infrastructure including a gateway system that provides connectivity with a transport network such as the Internet for instance. With this arrangement, a UE within coverage of the base station may engage in air interface communication with the base station, and may thereby communicate via the base station and gateway system with various other entities.

In general, a base station may provide service in accordance with a particular air interface protocol or radio access technology, examples of which include Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), IEEE 802.11 (WiFi), and others now known or later developed.

In accordance with the air interface protocol, each coverage area provided by the base station may operate on one or more radio frequency channels each spanning a range of frequency spectrum, and the air interface may be divided over time into a continuum of transmission time units, such as frames, subframes, timeslots, symbol durations, and the like, in which communications may pass on a downlink from the base station to the UEs and on an uplink from the UEs to the base station using a designated modulated and encoding scheme. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink and uplink channels may then define various sub-channels for carrying particular communications, such a control signaling and data (e.g., user communications or other application layer data) between the base station and served UEs.

As UEs enter into coverage of the base station, the base station may become configured with connections to serve those UEs. For instance, for each such UE entering coverage on a particular carrier, the base station may engage in signaling with the network infrastructure to establish a bearer connection for carrying data between the gateway system and the base station, and the base station may work with the UE to establish a radio-link-layer connection for carrying data over the air between the base station and the UE on the carrier. Once so configured, the base station may then serve the UEs. For instance, when data arrives over the transport network for transmission to a UE, the gateway system may transmit the data over the UE's bearer connection to the base station, and the base station may then transmit the data over the UE's radio-link-layer connection to the UE.

In such a system, the base station may manage the transmission of data on the downlink and uplink in the defined transmission time units and in particular resources, such as particular subcarriers, defined in those transmission time units. For instance, as the base station receives data destined to particular UEs, the base station may schedule downlink transmission of that data to occur in particular transmission time units and may transmit the data over the air to the UEs in the scheduled transmission time units. Similarly, as UEs have data to send to the base station, the UEs may send scheduling requests to the base station, the base station may then schedule uplink transmission of that data to occur in particular transmission time units, and the UEs may then transmit the data over the air to the base station in the scheduled transmission time units.

Further, since the wireless communication system has a limited amount of resources to assign (e.g., a limited number of air interface resources per unit time available for allocation), the system may determine a scheduling priority for assigning these resources to the various UEs. In particular, for each UE operating in the wireless communication system, the system may assign a scheduling priority level for resource allocation from the system. For instance, the system may give UEs equal scheduling priority levels for resource assignment from the wireless communication system. Alternatively, the system may give some UEs higher or lower scheduling priority levels for resource assignment from the wireless communication system than other UEs.

OVERVIEW

In any such wireless communication system, each carrier on which a base station provides service will have a limited supply of resources on which to transmit data to served UEs. For instance, each carrier will have a limited frequency bandwidth. Further, depending on the air interface protocol, only certain portions of a carrier's frequency bandwidth and/or certain segments of time may be designated for use to carry data to served UEs. Other resource limitations may be possible as well.

In order to help fairly manage data transmission resources given this limitation, the base station may be configured to impose a per-UE data transmission rate cap. When applying such a rate cap on the carrier, as the base station receives data packets for transmission to a UE on the carrier, the base station may limit its rate of transmission of that data to be no greater than the rate cap and may buffer any excess data (i.e., data at greater than the rate cap) destined to the UE. For this purpose, the base station may establish and maintain in physical data storage a respective data buffer for each such UE, with each such data buffer being statically or dynamically sized. Further, the base station may be configured to apply a buffer timeout process according to which the base station drops a data packet from the buffer in response to the data packet being in the buffer for a timeout period.

As the base station serves the plurality of UEs, the base station may periodically determine a packet drop rate for each of the plurality of UEs. The packet drop rate for a given UE may be determined as a ratio of a number of data packets destined to the given UE that are dropped by the base station via the buffer timeout process to a number of data packets destined to the given UE that are received by the base station, for example. The packet drop rate could be defined in other ways as well. Further, the base station may periodically compare the determined packet drop rate for each UE to a threshold packet drop rate. Based on a determination that a packet drop rate for a UE of the plurality of UEs exceeds the packet drop rate threshold, the base station may responsively increase a scheduling priority level for resource assignment from the base station to the UE. In particular, the base station may switch from operating in a first mode in which the base station gives the UE a first scheduling priority level for resource assignment from the base station to operating in a second mode in which the base station gives the UE a second scheduling priority level for resource assignment from the base station, where the second scheduling priority level is higher than the first scheduling priority level. Increasing the scheduling priority level for the UE from the first scheduling priority level to the second scheduling priority level may reduce the packet drop rate of the UE to a value below the threshold packet drop rate.

Accordingly, in one respect, disclosed is a method for allocating, among a plurality of user equipment devices (UEs) served by a base station, resources from the base station. The method comprises the base station operating in a first mode in which the base station gives a UE of the plurality of UEs a first scheduling priority level for resource assignment from the base station. The method further comprises the base station making a determination that a packet drop rate for the UE exceeds a threshold packet drop rate. The method further comprises, based on the determination, the base station switching from operating in the first mode to operating in a second mode in which the base station gives the UE a second scheduling priority level for resource assignment from the base station, wherein the second scheduling priority level is higher than the first scheduling priority level.

In another respect, disclosed is a base station that is configured to provide an air interface through which the base station serves a plurality of UEs, wherein the air interface defines a plurality of air interface resources per unit time, and wherein the base station is further configured to allocate the plurality of air interface resources per unit time among the plurality of UEs. The base station includes a wireless-communication interface for communication over the air interface. The base station also includes data storage configured to buffer a plurality of data packets destined to individual UEs of the plurality of UEs, wherein the base station applies a buffer timeout process according to which the base station drops a data packet from the buffer in response to the data packet being in the buffer for a timeout period. The base station further includes a controller configured to cause the base station to carry out operations comprising: (i) assigning a UE of the plurality of UEs a first scheduling priority level for resource assignment from the base station, (ii) determining a packet drop rate for the UE, wherein the packet drop rate comprises a ratio of a number of data packets dropped by the base station via the buffer timeout process to a number of data packets received by the base station, (iii) making a determination that the determined packet drop rate for the UE exceeds a threshold packet drop rate, and (iv) based on the determination, increasing the first scheduling priority level to a second scheduling priority level for resource assignment from the base station.

Further, in still another respect, disclosed is another method for allocating, among a plurality of UEs served by a base station, resources from the base station. The base station includes data storage configured to buffer a plurality of data packets destined to individual UEs of the plurality of UEs, and the base station applies a buffer timeout process according to which the base station drops a data packet from the buffer in response to the data packet being in the buffer for a timeout period. The method comprises the base station receiving a plurality of data packets destined to individual UEs of the plurality of UEs. The method further comprises the base station determining a packet drop rate for a UE of the plurality of UEs. The method further comprises the base station making a determination that the determined packet drop rate for the UE exceeds a threshold packet drop rate. The method further comprises, based on the determination, the base station switching from operating in a first mode in which the base station gives the UE a first scheduling priority level for resource assignment from the base station to operating in a second mode in which the base station gives the UE a second scheduling priority level for resource assignment from the base station, wherein the second scheduling priority level is higher than the first scheduling priority level.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that operations described here as being performed by one or more entities may be implemented in various ways, such as by a processor executing software instructions for instance.

Figure 1:
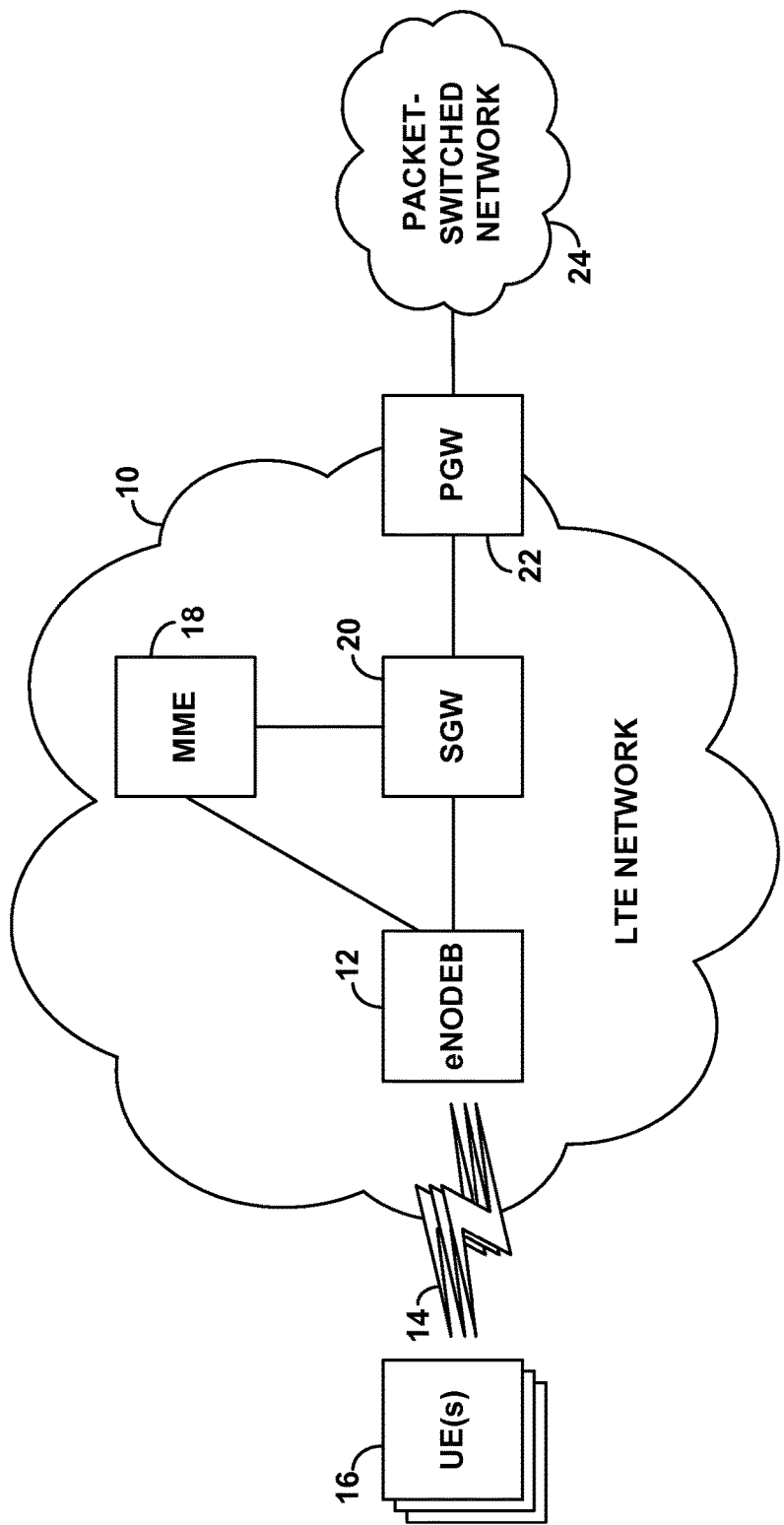
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area in which to serve UEs such as example UE(s) 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, eNodeB 12 is configured (e.g., licensed and equipped) to provide service on various air interfaces 14, each of which could be FDD or TDD, and each of which has a particular downlink frequency bandwidth. For instance, each of the air interfaces could have a downlink bandwidth such as 1.4 MHz, 3 MHz, 5 MHz, 15 MHz, or 20 MHz. In practice, each of these air interfaces (and/or, if FDD, its particular downlink and uplink frequency channels) may be identified by a globally unique identifier per industry standard, so that the eNodeB and a served UE can refer to particular carriers by those identifiers.

According to LTE, the air interface defines a plurality of air interface resources over a time continuum of 10-millisecond frames, each divided into ten 1-millisecond subframes defining two 0.5-millisecond slots, and each subframe is then divided into 14 symbol time segments (7 per slot). Further, an LTE air interface's frequency bandwidth defines a sequence of 15-kHz subcarriers, which are divided into groups of 12 subcarriers to define within each slot a number of physical resource blocks (PRBs). In particular, each PRB thus spans 12 subcarriers and 7 symbol time segments, thus defining an array of resource elements, each 1 subcarrier by one symbol time segment, in which data can be modulated for transmission. On an FDD carrier, all of the subframes per frame are used for both downlink and uplink communication. Whereas, on a TDD carrier, certain subframes per frame are used for downlink communication, and other subframes per frame are used for uplink communication.

Further, the LTE downlink defines certain channels in this air interface structure. In particular, the first one to three symbol time segments per downlink subframe may be reserved to define control channels such as a physical downlink control channel (PDCCH) for carrying scheduling directives and other control signaling. Further, the remaining symbol segments may be reserved to define a physical downlink shared channel (PDSCH) for carrying data to served UEs. Still further, certain resource elements throughout each subframe may be reserved to define a reference signal that UEs can detect and measure to evaluate coverage strength. In addition, other aspects of the LTE downlink structure, including variations or exceptions to those noted here, may exist as well.

When a UE, such as one of UE(s) 16, enters into coverage of eNodeB 12, the UE may detect the eNodeB's coverage on a particular air interface, and the UE may then engage in an attach process or handover process to register with the LTE network on that air interface. For instance, the UE may transmit to the eNodeB an attach request, which the eNodeB may pass along to the MME 18, triggering a process of authenticating the UE, provisioning the eNodeB with a service profile record for the UE, and establishing of one or more bearer connections for the UE between the eNodeB and the PGW 22. Further, the eNodeB and UE may engage in radio resource control (RRC) signaling to establish for the UE a radio-link-layer connection (RRC connection) on the carrier, with the eNodeB and UE each storing a context record indicating that the eNodeB is serving the UE on that carrier.

Once the UE is so attached with the eNodeB, the eNodeB may then serve the UE. For instance, as the PGW 22 receives data destined to the UE, that data may flow from the PGW 22 to the SGW 20 to the eNodeB on an applicable bearer connection, and the eNodeB may schedule air interface transmission of the data to the UE and accordingly transmit the data to the UE. In practice, for example, the eNodeB may apply a scheduler to select and allocate a number of PRBs in which to provide the transmission in a given subframe, and the eNodeB may transmit to the UE on the PDCCH of that subframe a downlink control information (DCI) message specifying the allocated PRBs and modulate the data on the resource elements in the allocated PRBs. And the UE may then receive the DCI, determine which PRBs carry the data, and demodulate to receive the transmitted data from the resource elements of those PRBs.

Under LTE, scheduling is typically performed on a transmission time interval basis (TTI) basis. Each TTI is one (1) millisecond and typically includes two resource blocks. The number of resource blocks available for allocation to UE(s) 16 may vary. For example, a channel bandwidth of 5 MHz typically has 25 resource blocks available for allocation per 1 ms, a channel bandwidth of 10 MHz typically has 50 resource blocks available for allocation per 1 ms, a channel bandwidth of 15 MHz typically has 75 resource blocks available for allocation per 1 ms, and a channel bandwidth of 20 MHz typically has 100 resource blocks available for allocation per 1 ms. Other examples are possible as well.

Further, since eNodeB 12 has a limited amount of resources to assign (e.g., a limited number of resource blocks available for allocation), eNodeB 12 may determine priority for assigning these resources to the various UEs using the resources. In particular, when assigning resources from eNodeB 12 to UEs operating in the network, eNodeB 12 may give, to each UE using resources from eNodeB 12, a given priority scheduling level for resource assignment from eNodeB 12. For instance, eNodeB 12 may give UEs an equal scheduling priority level for resource assignment from eNodeB 12. Alternatively, eNodeB 12 may give some UEs higher or lower scheduling priority levels for resource assignment from eNodeB 12 than other UEs.

The act of giving scheduling priority levels for resource assignment from eNodeB 12 to UE(s) 16 may take various forms. In one example, eNodeB 12 may initially implement round robin scheduling in which eNodeB 12 assigns resources cyclically to each of the plurality of UEs 16. In particular, when implementing round robin scheduling, eNodeB 12 may maintain a separate queue for data packets destined to each UE of the plurality of UEs 16, and eNodeB 12 may take turns in transferring one data packet from a respective queue to each respective UE in a periodically repeated order. For example, in a case where (i) RF conditions are the same for UEs and (ii) the UEs have the same data requirements, round robin scheduling would result in transferring data packets from a respective queue to each respective UE at a 1:1 ratio. Other scheduling examples are possible as well.

As discussed above, in order to help fairly manage data transmission resources in the LTE network 10, eNodeB 12 may be configured to impose a per-UE data transmission rate cap. When applying such a rate cap, as eNodeB 12 receives data packets for transmission to a UE in the LTE network 10, eNodeB 12 may limit its rate of transmission of that data to be no greater than the rate cap and may buffer any excess data (i.e., data at greater than the rate cap) destined to the UE. For this purpose, eNodeB 12 may establish and maintain in physical data storage a respective data buffer for each such UE. Further, eNodeB 12 may be configured to apply a buffer timeout process according to which eNodeB 12 drops a data packet from the buffer in response to the data packet being in the buffer for a timeout period.

As eNodeB 12 serves the plurality of UEs 16, eNodeB 12 may periodically determine a packet drop rate for each of the plurality of UEs 16. In one particular example, the packet drop rate for a given UE may be determined as a ratio of a number of data packets destined to the given UE that are dropped by eNodeB 12 via the buffer timeout process to a number of data packets destined to the given UE that are received by eNodeB 12. Further, eNodeB 12 may periodically compare the determined packet drop rate for each UE to a threshold packet drop rate. In one example, eNodeB 12 may periodically determine an average packet drop rate for the plurality of UEs 16 in the LTE network 10, and eNodeB 12 may set the threshold packet drop rate to a most recently periodically determined average packet drop rate.

Based on a determination that a packet drop rate for a UE of the plurality of UEs 16 exceeds the packet drop rate threshold, eNodeB 12 may responsively increase a scheduling priority level for resource assignment from eNodeB 12 to the UE. In particular, eNodeB 12 may switch from operating in a first mode in which eNodeB 12 gives the UE a first scheduling priority level for resource assignment from eNodeB 12 to operating in a second mode in which eNodeB 12 gives the UE a second scheduling priority level for resource assignment from eNodeB 12, where the second scheduling priority level is higher than the first scheduling priority level. Increasing the scheduling priority level for the UE from the first scheduling priority level to the second scheduling priority level may reduce the packet drop rate of the UE to a value below the threshold packet drop rate.

In one particular example, eNodeB 12 may be a donor base station, and the UE may be a relay node served by the donor base station over a relay backhaul link. Further, such a relay node may be configured to serve one or more UEs over a relay access link. In such an example, the relay node may not receive enough air interface resources from the donor base station to handle high demand from the one or more UEs served by the relay node over the relay access link. Thus, data packets destined for the relay node from the donor base station may be buffered by the donor base station for a period of time exceeding the buffer timeout period, and such data packets may be dropped by the donor base station due to the buffer timeout process as discussed above. As such, the packet drop rate for the relay node may exceed the threshold packet drop rate, and the donor base station may responsively switch to operating in the second mode in which the donor base station gives the relay node higher scheduling priority than other UEs for resource assignment from the donor base station. Other examples are possible as well.

Increasing the scheduling priority level for the UE from the first scheduling priority level to the second scheduling priority level may take various forms. For instance, increasing the scheduling priority level for the UE from the first scheduling priority level to the second scheduling priority level may involve increasing a scheduling weight factor for scheduling communications from eNodeB 12 to the UE from a first scheduling weight factor to a second scheduling weight factor. Using the round robin scheduling example described above, in the first mode, eNodeB 12 may apply a first scheduling weight factor of 1 to the UE, such that eNodeB 12 takes turns in transferring one data packet from a respective queue to each respective UE in a periodically repeated order. As such, in a case where (i) RF conditions are the same for UEs and (ii) the UEs have the same data requirements, round robin scheduling with the first scheduling weigh factor of 1 would result in transferring data packets from a respective queue to each respective UE at a 1:1 ratio. In the second mode, eNodeB 12 may apply a second scheduling weight factor of 2 to the UE, such that eNodeB 12 transfers two data packets from a queue for the UE to the UE in a periodically repeated order. As such, the second scheduling weight factor causes the UE to receive a greater portion of resources per unit time from eNodeB 12 in the second mode than in the first mode.

In another example, giving the UE the first scheduling priority level may include assigning a first number of air interface resources per unit time to the UE. In such an example, giving the UE the second scheduling priority level may include assigning a second number of air interface resources per unit time to the UE, where the second number is greater than the first number. In an example embodiment, assigning more air interface resources per unit time from eNodeB 12 to the UE in the second mode than in the first mode includes assigning a greater number of PRBs from eNodeB 12 to the UE in the second mode than in the first mode. As a particular example, in the first mode, eNodeB 12 may assign 10 resource blocks from eNodeB 12 to the UE over a given period of time, while in the second mode, eNodeB 12 may assign 20 resource blocks from eNodeB 12 to the UE over the same period of time.

In one example, increasing the scheduling priority level for the UE from the first scheduling priority level to the second scheduling priority level may reduce the packet drop rate of the UE to a value below the threshold packet drop rate. For instance, eNodeB 12 could be provided with a policy table that correlates the packet drop rate of the UE with a corresponding scheduling weight factor that is intended to reduce the packet drop rate of the UE to a value below the threshold packet drop rate. In such an example, when eNodeB 12 switches from operating in the first mode to operating in the second mode, eNodeB 12 may refer to that policy table to determine the scheduling weight factor for the UE, and may responsively apply the determined scheduling weight factor to the UE. Similarly, eNodeB 12 could be provided with policy table that correlates the packet drop rate of the UE with a corresponding number of air interface resources per unit time that, when assigned by eNodeB 12 to the UE, are intended to reduce the packet drop rate of the UE to a value below the threshold packet drop rate. In such an example, when eNodeB 12 switches from operating in the first mode to operating in the second mode, eNodeB 12 may refer to that policy table to determine the number of air interface resources per unit time to be assigned from eNodeB 12 to the UE, and may responsively assign the determined number of air interfaces resources per unit time to the UE.

Figure 2:
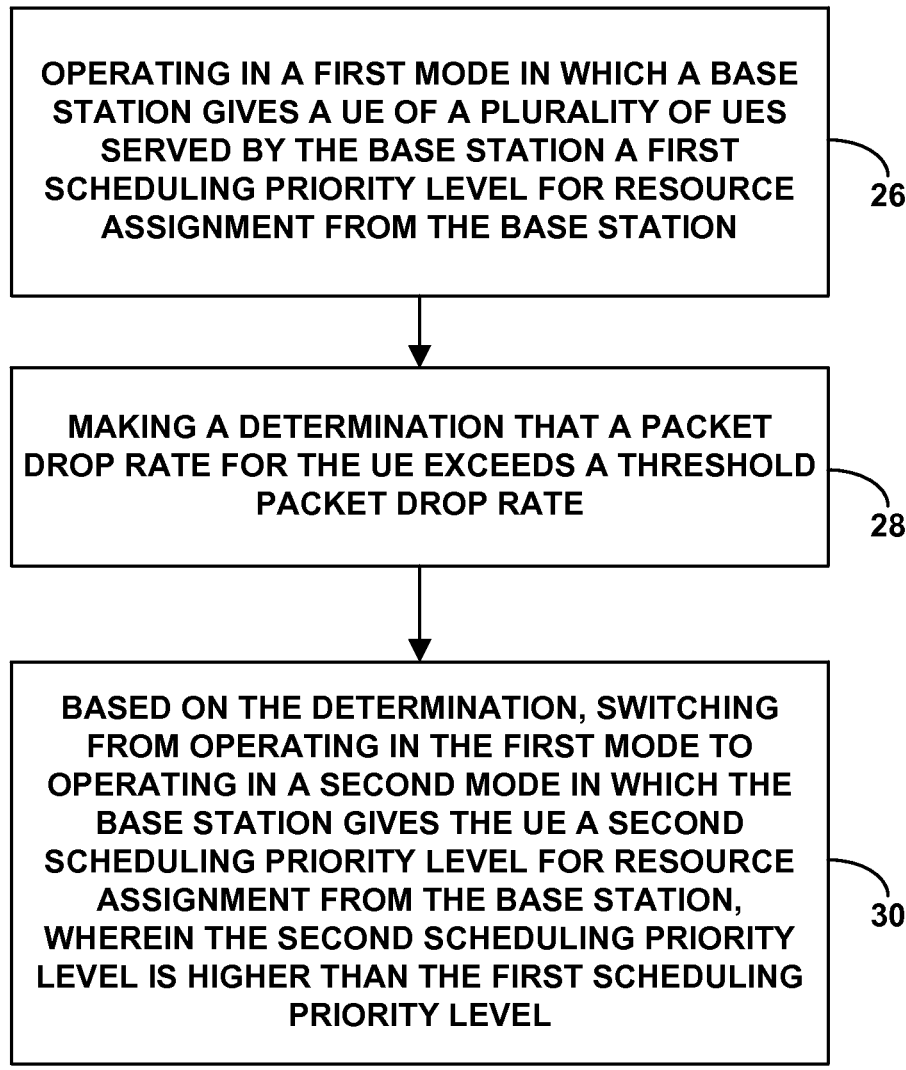
FIG. 2 is a flow chart depicting example operations in accordance with the disclosure.

FIG. 2 is next a flow chart depicting in summary a method that may be carried out by a representative base station and/or one or more other network entities (e.g., an SGW, PGW, or other entity in the data transmission path), to help allocate resources from a base station. As shown in FIG. 2, at block 26, the method involves operating in a first mode in which the base station gives a UE of a plurality of UEs served by the base station a first scheduling priority level for resource assignment from the base station. At block 28, the method involves making a determination that a packet drop rate for the UE exceeds a threshold packet drop rate. At block 30, the method involves, based on the determination, switching from operating in the first mode to operating in a second mode in which the base station gives the UE a second scheduling priority level for resource assignment from the base station, wherein the second scheduling priority level is higher than the first scheduling priority level. As discussed above, switching from operating in the first mode to operating in the second mode may include increasing the scheduling priority that the base station gives the UE. Increasing the scheduling priority level for the UE from the first scheduling priority level to the second scheduling priority level may reduce the packet drop rate of the UE to a value below the threshold packet drop rate.

In one example, the determination that the determined packet drop rate for the UE exceeds the threshold packet drop rate is a first determination. In such an example, the method may further involve (i) making a second determination that the packet drop rate for the UE no longer exceeds the threshold packet drop rate, and (ii) based on the second determination, reverting from operating in the second mode to operating in the first mode.

In yet another example, the determination that the determined packet drop rate for the UE exceeds the threshold packet drop rate is a first determination. In such an example, the method may further involve making a second determination that the packet drop rate for the UE no longer exceeds the threshold packet drop rate. The method may further involve, based on the second determination, switching from operating in the second mode to operating in a third mode in which the base station reduces the second scheduling priority level to a third scheduling priority level for resource assignment from the base station, wherein the third scheduling priority level is still higher than the first scheduling priority level. Thereafter, the method may involve making a third determination that the packet drop rate for the UE is still below the threshold packet drop rate. Further still, the method may involve, based on the third determination, switching from operating in the third mode to operating in the first mode.

Figure 3:
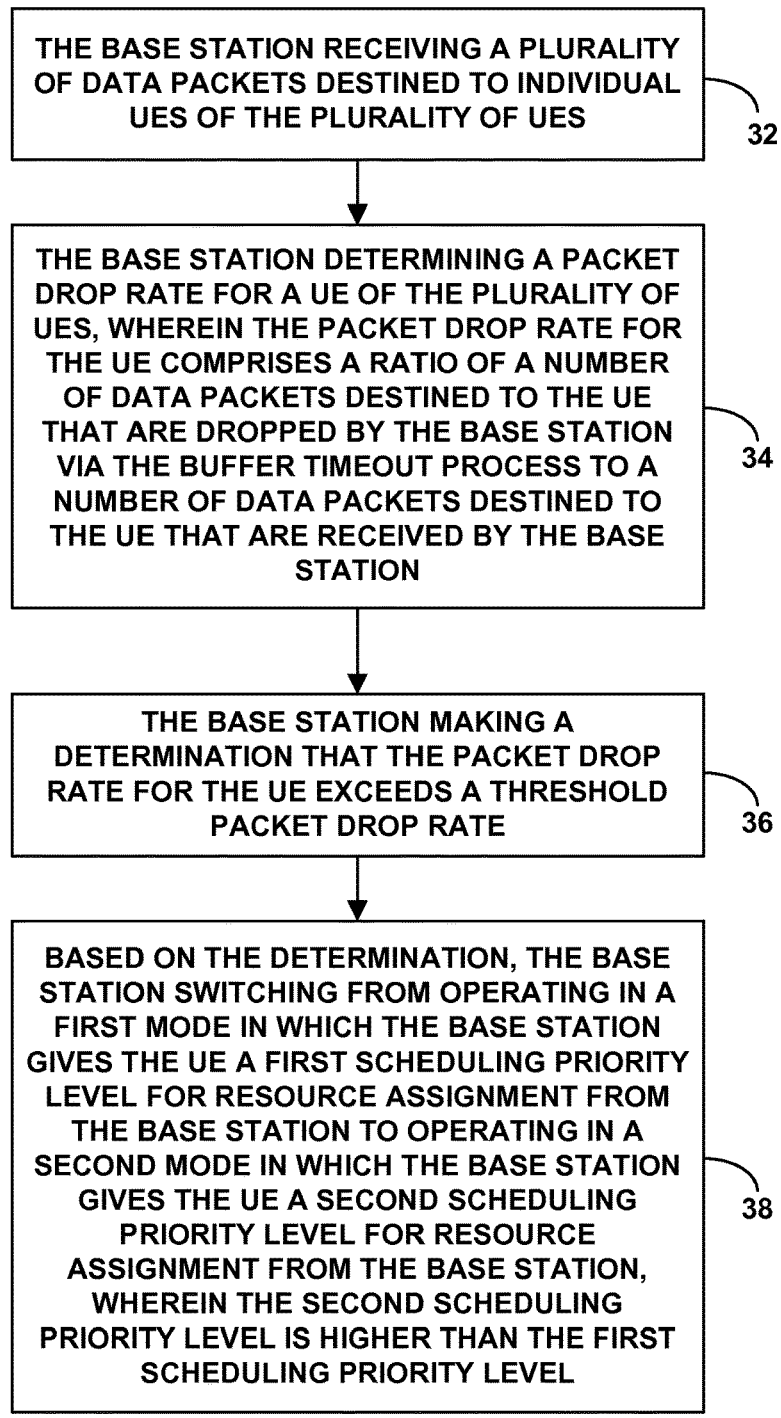
FIG. 3 is another flow chart depicting example operations in accordance with the disclosure.

FIG. 3 is next another flow chart depicting an alternative embodiment of the method, again as may be carried out by a representative base station, to help allocate resources from the base station. The representative base station includes data storage configured to buffer a plurality of data packets destined to individual UEs of the plurality of UEs, and the base station applies a buffer timeout process according to which the base station drops a data packet from the buffer in response to the data packet being in the buffer for a timeout period. As shown in FIG. 3, at block 32, the method involves the base station receiving a plurality of data packets destined to individual UEs of the plurality of UEs. At block 34, the method involves the base station determining a packet drop rate for a UE of the plurality of UEs. In one particular example, the packet drop rate for the UE comprises a ratio of a number of data packets destined to the UE that are dropped by the base station via the buffer timeout process to a number of data packets destined to the UE that are received by the base station. The packet drop rate could be defined in other ways as well. At block 36, the method involves the base station making a determination that the packet drop rate for the UE exceeds a threshold packet drop rate. At block 38, the method involves, based on the determination, the base station switching from operating in a first mode in which the base station gives the UE a first scheduling priority level for resource assignment from the base station to operating in a second mode in which the base station gives the UE a second scheduling priority level for resource assignment from the base station, wherein the second scheduling priority level is higher than the first scheduling priority level.

Figure 4:
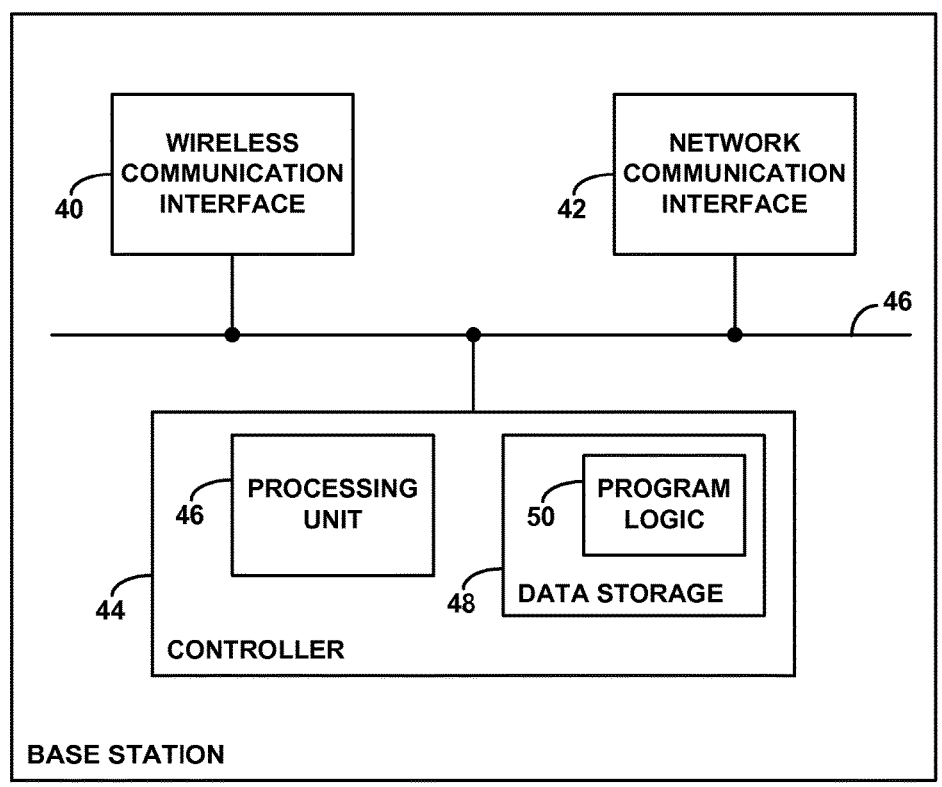
FIG. 4 is a simplified block diagram of an example base station operable in accordance with the disclosure.

Finally, FIG. 4 is a simplified block diagram of a base station (e.g., macro eNodeB, small cell, or other type of base station), showing some of the components that such an entity may include in order to carry out these and other operations. As shown, the example base station includes a wireless communication interface 40, a network communication interface 42, and a controller 44, all of which could be integrated together in various ways or, as shown, interconnected with each other through a system bus, network, or other connection mechanism 46.

Wireless communication interface 40 may function to wirelessly serve various entities, such as UEs as discussed above. As such, the wireless communication interface 40 may comprise an antenna arrangement (not shown), which may be tower mounted, and associated components such as a power amplifier and a cell site modem (not shown), so as to transmit and receive bearer and control data. Network interface 42 may then comprise a wired or wireless interface for communicating with various network infrastructure.

Controller 44, which may be integrated with wireless communication interface 40 or with one or more other components of the eNodeB, may then be configured to manage communication over the air interface, including managing allocation of air interface resources in accordance with the present disclosure. By way of example, controller 44 is shown including a processing unit (e.g., one or more microprocessors or other processors) 46, data storage (e.g., one or more volatile and/or non-volatile non-transitory storage components, such as magnetic, optical, and/or flash storage) 48, and program logic 50 stored in the data storage 48, and executable by the processing unit 46 to carry out various disclosed base station operations.

By way of example, controller 44 may be configured to cause the base station to carry out operations comprising (i) assigning a UE of the plurality of UEs a first scheduling priority level for resource assignment from the base station, (ii) determining a packet drop rate for the UE, (iii) making a determination that the packet drop rate for the UE exceeds a threshold packet drop rate, and (iv) based on the determination, increasing the first scheduling priority level to a second scheduling priority level for resource assignment from the base station.

Exemplary embodiments have been described above. Those skilled in the art will understand, however, that changes and modifications may be made to these embodiments without departing from the true scope and spirit of the invention.

We claim:

1. A method for controlling resource allocation by a base station among a plurality of user equipment devices (UEs) served by the base station, the method comprising:
   the base station operating in a first mode in which the base station gives a UE of the plurality of UEs a first scheduling priority level for resource assignment by the base station;
   the base station periodically determining an average packet drop rate of the plurality of UEs served by the base station;
   the base station setting a threshold packet drop rate to a most recently determined average packet drop rate;
   the base station making a first determination that a current packet drop rate for the UE exceeds the threshold packet drop rate;
   based on the first determination, the base station switching from operating in the first mode to operating in a second mode in which the base station gives the UE a second scheduling priority level for resource assignment by the base station, wherein the second scheduling priority level is higher than the first scheduling priority level;

the base station making a second determination that the packet drop rate for the UE no longer exceeds the threshold packet drop rate; and based on the second determination, the base station switching from operating in the second mode to operating in a third mode in which the base station gives the UE a third scheduling priority level for resource assignment by the base station, wherein the third scheduling priority level is higher than the first scheduling priority level and lower than the second scheduling priority level.

2. The method of claim 1, wherein the first scheduling priority level includes a first scheduling weight factor for scheduling communications from the base station to the UE, and wherein the second scheduling priority level includes a second scheduling weight factor for scheduling communications from the base station to the UE, wherein the second scheduling weight factor causes the UE to receive a greater portion of resources per unit time from the base station in the second mode than in the first mode.

3. The method of claim 1, the method further comprising:

thereafter, the base station making a third determination that the packet drop rate for the UE is still below the threshold packet drop rate; and based on the third determination, the base station switching from operating in the third mode to operating in the first mode.

4. The method of claim 1, wherein the base station is configured to provide an air interface through which the base station serves the plurality of UEs, and wherein the air interface defines a plurality of air interface resources per unit time, wherein the first scheduling priority level includes a first number of air interface resources per unit time to the UE, and wherein the second scheduling priority level includes a second number of air interface resources per unit time to the UE, wherein the second number is greater than the first number.

5. The method of claim 1, wherein the base station applies a buffer timeout process according to which the base station drops a data packet from a buffer in response to the data packet being in the buffer for a timeout period, and wherein the packet drop rate comprises a ratio of a number of data packets dropped by the base station via the buffer timeout process to a number of data packets received by the base station.

6. The method of claim 1, wherein switching from operating in the first mode to operating in the second mode reduces the packet drop rate of the UE to a value below the threshold packet drop rate.

7. A base station configured to provide an air interface through which the base station serves a plurality of user equipment devices (UEs), wherein the air interface defines a plurality of air interface resources per unit time, and wherein the base station is further configured to allocate the plurality of air interface resources per unit time among the plurality of UEs, the base station comprising:

a wireless-communication interface for communication over the air interface;

data storage configured to buffer a plurality of data packets destined to individual UEs of the plurality of UEs, wherein the base station applies a buffer timeout process according to which the base station drops a data packet from a buffer in response to the data packet being in the buffer for a timeout period; and a controller configured to cause the base station to carry out operations comprising:

assigning to a UE of the plurality of UEs a first scheduling priority level for resource assignment by the base station;

periodically determining an average packet drop rate of the plurality of UEs served by the base station;

setting a threshold packet drop rate to a most recently determined average packet drop rate;

determining a current packet drop rate for the UE;

making a first determination that the determined packet drop rate for the UE exceeds the threshold packet drop rate; and based on the first determination, assigning to the UE a second scheduling priority level for resource assignment by the base station, wherein the second scheduling priority level is higher than the first scheduling priority level;

making a second determination that the packet drop rate for the UE no longer exceeds the threshold packet drop rate; and based on the second determination, assigning to the UE a third scheduling priority level for resource assignment by the base station, wherein the third scheduling priority level is higher than the first scheduling priority level and lower than the second scheduling priority level.

8. The base station of claim 7, wherein the packet drop rate comprises a ratio of a number of data packets dropped by the base station via the buffer timeout process to a number of data packets received by the base station.

9. The base station of claim 7, wherein the first scheduling priority level includes a first scheduling weight factor for scheduling communications from the base station to the UE, and wherein the second scheduling priority level includes a second scheduling weight factor for scheduling communications from the base station to the UE, wherein the second scheduling weight factor causes the UE to receive a greater portion of resources per unit time from the base station in the second scheduling priority level than in the first scheduling priority level.

10. The base station of claim 7, wherein the controller is further configured to carry out operations comprising:

thereafter, making a third determination that the packet drop rate for the UE is still below the threshold packet drop rate; and based on the third determination, decreasing the third scheduling priority level to the first scheduling priority level.

11. A method for controlling resource allocation by a base station among a plurality of user equipment devices (UEs) served by the base station, wherein the base station includes data storage configured to buffer a plurality of data packets destined to individual UEs of the plurality of UEs, and wherein the base station applies a buffer timeout process according to which the base station drops a data packet from a buffer in response to the data packet being in the buffer for a timeout period, the method comprising:

the base station receiving a plurality of data packets destined to individual UEs of the plurality of UEs;

the base station periodically determining an average packet drop rate of the plurality of UEs served by the base station;

the base station setting a threshold packet drop rate to a most recently determined average packet drop rate;

the base station determining a current packet drop rate for a UE of the plurality of UEs;

the base station making a first determination that the determined packet drop rate for the UE exceeds the threshold packet drop rate;

based on the first determination, the base station switching from operating in a first mode in which the base station gives the UE a first scheduling priority level for resource assignment by the base station to operating in a second mode in which the base station gives the UE a second scheduling priority level for resource assignment by the base station, wherein the second scheduling priority level is higher than the first scheduling priority level;

the base station making a second determination that the packet drop rate for the UE no longer exceeds the threshold packet drop rate; and based on the second determination, the base station switching from operating in the second mode to operating in a third mode in which the base station gives the UE a third scheduling priority level for resource assignment by the base station, wherein the third scheduling priority level is higher than the first scheduling priority level and lower than the second scheduling priority level.

12. The method of claim 11,
wherein the first scheduling priority level includes a first scheduling weight factor for scheduling communications from the base station to the UE, and
wherein the second scheduling priority level includes a second scheduling weight factor for scheduling communications from the base station to the UE, wherein the second scheduling weight factor causes the UE to receive a greater portion of resources per unit time from the base station in the second mode than in the first mode.

13. The method of claim 11, wherein the base station is configured to provide an air interface through which the base station serves the plurality of UEs, and wherein the air interface defines a plurality of air interface resources per unit time,
wherein the first scheduling priority level includes a first number of air interface resources per unit time to the UE, and
wherein the second scheduling priority level includes a second number of air interface resources per unit time to the UE, wherein the second number is greater than the first number.

14. The method of claim 11, the method further comprising:
thereafter, the base station making a third determination that the packet drop rate for the UE is still below the threshold packet drop rate; and
based on the third determination, the base station switching from operating in the third mode to operating in the first mode.

* * * * *